United States Patent
Wu

(10) Patent No.: US 6,539,479 B1
(45) Date of Patent: Mar. 25, 2003

(54) SYSTEM AND METHOD FOR SECURELY LOGGING ONTO A REMOTELY LOCATED COMPUTER

(75) Inventor: Thomas J. Wu, Mountain View, CA (US)

(73) Assignee: The Board of Trustees of the Leland Stanford Junior University, Stanford, CA (US)

( * ) Notice: Subject to any disclaimer, the term of this patent is extended or adjusted under 35 U.S.C. 154(b) by 0 days.

(21) Appl. No.: 09/114,726

(22) Filed: Jul. 14, 1998

Related U.S. Application Data

(60) Provisional application No. 60/052,575, filed on Jul. 15, 1997.

(51) Int. Cl.$^7$ .............................. H04L 9/08; H04L 9/28; H04L 9/30; H04L 9/39
(52) U.S. Cl. ...................... 713/151; 709/200; 709/223; 709/224; 709/228; 713/151; 713/200; 713/201; 380/227; 380/279; 380/285
(58) Field of Search .............................. 380/277, 44–47, 380/30; 713/200, 201, 151; 709/217, 200, 223, 228

(56) References Cited

U.S. PATENT DOCUMENTS

| | | | | |
|---|---|---|---|---|
| 5,241,599 A | * | 8/1993 | Bellovin et al. | 380/21 |
| 5,440,635 A | * | 8/1995 | Bellovin et al. | 380/25 |
| 5,761,305 A | * | 6/1998 | Vanstone et al. | 380/21 |

OTHER PUBLICATIONS

D. Jablon, "Strong Password–Only Authenticated key Exchange", ACM Computer Communications Review, vol. 26, issue 5, pp. 5–26, Oct. 1996.*

Kaufman et al., Network Security: Private Communications in a Public World, Prentice–Hall, 1998. P. 244, 448–489.

Clark, J. "Attacking Authentication Protocols," 1996, (1–20).

* cited by examiner

*Primary Examiner*—Gail Hayes
*Assistant Examiner*—Taghi T. Arani
(74) *Attorney, Agent, or Firm*—Dorsey & Whitney LLP

(57) ABSTRACT

Prior to a login session, a server computer stores a password verification value v for each of a plurality of authorized users. Each user generates a password verification value v from a secret value x that corresponds to the user's password. When a client computer attempts to establish a login session between the server computer and client computer, the following steps are performed. The server computer receives a user identifier and retrieves the password verification value for the user. The client computer generates a first public value $w_p$ by applying the one-way function to a first secret value $w_s$, and sends $w_p$ to the server computer. The server computer generates a second public value $y_p$ by applying the one-way function to a second secret value $y_s$, and sends $y_p$ to the client computer. The server computer also generates a server session key $K_1$ by applying a first predefined session key generation function to $w_p$, v and $y_s$. The client computer regenerates the user's secret value x, and then generates a client session key $K_2$ by applying a second predefined session key generation function to $y_p$, $w_s$, and x. Then the client and server computers exchange a set of messages so that each can verify that the other computer's session key is equal to its locally generated session key. The login session is established only if the server computer verifies that the server and client session keys match.

38 Claims, 4 Drawing Sheets

SYSTEM AND METHOD FOR SECURELY LOGGING ONTO A REMOTELY LOCATED COMPUTER

This application claims priority on U.S. provisional patent application 60/052,575, filed Jul. 15, 1997, which is hereby incorporated by reference in its entirety.

This invention was made with Government support under contract DABT63-94-C-0055 awarded by the Advanced Research Projects Agency. The Government has certain rights in this invention.

BACKGROUND OF THE INVENTION

The present invention relates generally to systems and methods for enabling a user using a host computer to securely log onto a server computer even in the presence of eavesdroppers and other forms of security attacks.

While there are many different password authentication protocols, they all solve the same problem: one party must somehow prove to another party that he knows a password p, which might have been set in advance. These protocols vary from the trivial to the incredibly complex, and many offer some form of protection from various attacks mounted by third parties.

Password protection has been the cornerstone of multiuser system security for decades. The advent of networking has given users convenient and transparent remote access to their systems. It has also created a whole new set of problems for people who use public networks to access these systems, because such networks are vulnerable to passive snooping and to some degree, active interference.

The present invention addresses these issues with a protocol that can be safely negotiated over an insecure network without compromising system security and which has several other useful properties not present in other commonly-used authentication protocols. Some of these properties make the present invention uniquely suitable for integration with existing system security applications.

All multiuser systems need some mechanism to identify which users are allowed to access the system and what privileges those users have. Nearly all such systems require that the user type in some sort of secret string, referred to as a password, that presumably is known only to that user. When the user identifies himself at login time, the system asks him for his password, and if he enters it correctly, the system gives him access to his account. This works fine when users are sitting at the console of the machine or at terminals connected directly to it, but networked systems are troublesome because even an inexperienced intruder can monitor the activity on a network fairly easily. Since most systems carry out the login and password exchange without encryption, anyone can "snoop" the network while someone logs in, capture their username and password as they are typed, and impersonate that user at a later time on that system.

Although networking has been commonplace for over a decade, most modern multiuser systems still do not employ any built-in form of encryption to prevent passwords from being snooped. Instead, there exist a variety of add-on products that attempt to address the security problems associated with networks. They offer varying degrees of protection from different kinds of potential attacks, but they generally require both users and administrators to take extra steps to achieve this security. Some of them require that the user maintain an entire list of passwords or keep key files on the client side for use by the authentication software.

The present invention relates to direct password authentication. Mechanisms that fall into this category of authentication cannot rely on persistent stored information stored on the client side. The user's password, which is a memorized quantity, is the only secret available to the client software. It is assumed that the network between the client and server is vulnerable to both eavesdropping and deliberate tampering. In addition, no trusted third party such as a key server or arbitrator can be used; only the original two parties can engage in the authentication protocol.

The present invention distinguishes itself from the rest of the field by offering features long thought to be unattainable simultaneously:

Secure against passive snooping. A passive attacker cannot obtain any information that would enable him to authenticate successfully to the server. This includes immunity to replay attacks.

End-to-end session encryption. An intruder cannot monitor a user's activities or "hijack" an authenticated session. In other words, any attempt to tamper with the network connection and to hijack an authenticated session will fail.

Forward secrecy and compromise containment. A captured password cannot be used to compromise past or currently encrypted sessions. A broken or compromised session key will not help an attacker deduce or even make guesses at the password.

Two-party operation. Neither a trusted third party nor a secure, central key server is needed.

Password-only client-side operation. Users do not need to maintain any files or keys on the client side. They only need to input their password to the client login program.

No secret information stored on the server. The password file stored on the server can be made public with little or no impact on system security. Very few secure protocols permit this, and those that do invariably fail to meet one or more of the other requirements.

The last two features taken together allow the protocol of the present invention to be used as a general-purpose remote and local authenticated login system, augmenting or even replacing the utilities now found on most operating systems.

The Players in a Hostile Login Environment

For the rest of this document, computer login security will be described with reference to the following set of hypothetical characters and the computer system 100 shown in FIG. 1:

Steve operates the network's server 102.

Carol, a user sitting at a client machine/terminal 104, wishes to log in remotely to the server 102 belonging to Steve.

Since Steve knows Carol, he has given her some privileges that an ordinary (and potentially hostile) user on the system, like Henry, doesn't have.

Henry is also a user of the system who assesses the server using another client machine or terminal 106. However, Henry would like nothing more than to gain access to Carol's account, if for no better reason than to use all those fancy privileges and read Carol's e-mail.

Eve is an eavesdropper who has managed to install some packet sniffing software on her computer 108, which happens to be located on the network between Carol's client computer 104 and Steve's server 102.

Mallory works for a rival company and has a client computer 110 with direct access to the same network (and more resources). He can intercept, alter, and inject messages into the network at will, and he can make any of his messages appear to come from anywhere he chooses.

In other words, Carol's computer 104 is a client, and Steve's computer 102 is the server. Alice is another friendly party requiring parallel access to the system. Henry is a hostile user who already has access to the system but who seeks access to Carol's account. Eve is conducting passive (eavesdropping) attacks over the network, while Mallory is conducting active (malicious) attacks.

It is assumed that Henry, Eve, and Mallory are cooperating and can exchange information freely, while Steve and Carol might not be able to meet very often and do not have any other means of secure communication that cannot be compromised by Eve or Mallory.

The server computer 102 includes a central processing unit 120, memory 122 and a network interface (NIC) 124. The memory 122, which will typically include both random access memory (RAM) and non-volatile memory (e.g., disk storage), stores:

an operating system 126;

a server side password authentication procedure 128, used for verifying that user asking to log onto the server are who they claim to be;

a password file 130, which may be a publicly accessible file (i.e., readable by all users of the system 100) containing password information for each authorized users of the system;

client files 132, including programs and data belonging to the various authorized users of the server 102.

As will be described in more detail below, the password information in the password file 130 for each user may be the users public key, or the hash of the user's password, or some other value that can be used to verify a user's asserted password without revealing the password itself.

Carol's client computer 104 includes a central processing unit 140, memory 142, a network interface (NIC) 144, and a user interface 146 (e.g., including a display, keyboard, pointer device, and so on). The memory 142, which will typically include both random access memory (RAM) and non-volatile memory (e.g., disk storage), stores:

an operating system 150;

a client side login procedure 152, used for logging onto the server; and other programs and data not relevant to the present discussion.

Points of Attack

As in the real world, Eve, Mallory, and Henry have quite a few options for compromising system security. Attacks can be classified based on the following categories:

Passive attacks are based on information that an intruder observes being exchanged between Carol and Steve. For this scenario, Eve will be mostly responsible for these attacks. Passive attacks are considered to be easy to carry out; anyone with access to any of the networks between Carol and Steve can monitor traffic with minimal difficulty, so it is important that a protocol not be susceptible to such attacks.

Active attacks involve some form of manipulation of the network between Carol and Steve. Examples include intercepting, substituting, or replaying packets, or forging entire messages that appear to come from one party. Mallory will carry out active attacks under this scenario. These attacks require much more effort to carry out and are generally considered less of a threat for a typical system. Nevertheless, there are some situations in which such an attack becomes feasible, so an authentication protocol should guard against them as well.

Off-line attacks are carried out in their entirety without directly involving Carol or Steve. For example, making a copy of Steve's password file and running a password-cracking program on it constitutes an off-line attack, since the attack does not require either Carol or Steve to be active while the attack takes place.

On-line attacks can only take place with at least one of the parties active. The obvious example would be for an intruder to attempt to log in to Steve's system repeatedly, guessing different passwords each time. All systems can be attacked this way, and it is assumed that the inefficiency of these attacks, coupled with the high possibility of detection given suitable precautions, makes them impractical.

External attacks are mounted by agents who are untrusted and unknown to Carol and Steve. They only have access to information that is advertised as "public." For the purposes of this document, any information that is sent over the public network between Carol and Steve will fall into this category. Either Eve or Mallory could execute an external attack.

Internal attacks can be carried out by someone who already has some kind of access to either end of the protocol. Examples might be other people who have access to the client or server hosts. Obviously, these are more difficult to prevent than external attacks. In our scenarios, only Henry has the access needed for an internal attack.

All of the known attacks fall into one or more of the above categories. Furthermore, some of the attacks discussed later can take advantage of a compromise of some other part of the system. Such conditions will be noted where applicable.

Prior Art Authentication Protocols

Many existing systems authenticate session participants by sending a password from the client to the server in cleartext or by encoding it with an easily reversible transform. This is highly insecure, as Eve could easily obtain Carol's password by eavesdropping.

"Challenge-response" systems provide slightly more security, by requiring the client to respond to a randomly-generated challenge from the server. These protocols, however, are universally subject to brute-force attack against the secret password. To fix this, the system must use some form of private key storage, like a smartcard, which loses the convenience benefits of a password-only system. Related systems like S/Key and Kerberos all suffer from this weakness. In addition, these systems store plaintext-equivalent information in the password file, making a compromise of the password file potentially disastrous.

The newest systems, up until now, have been "public-key-assisted" authentication schemes, like the Secure Shell (ssh) and the Secure Socket Layer (SSL). These protocols attempt to set up a secure channel between client and server, and use this channel to send the password to the server. While this resists passive attacks better than challenge-response protocols, the practice of encrypting before authentication is actually a subtle protocol design error. It allows active attacks such as the "man-in-the-middle" attack, allowing Mallory to intercept the password in some cases. This can be prevented by resorting to a public-key or certificate infrastructure, but is potentially expensive and difficult to maintain for a simple login method.

Diffie-Hellman

The Diffie-Hellman protocol, described in U.S. Pat. No. 4,200,770, is an unauthenticated key agreement protocol.

While not specifically designed for login management, it is easily adapted for that purpose. In Diffie-Hellman, the two parties each generate a public/private key pair (e.g., Carol generates public/private key pair $x_p$ and $x_s$, and Steve computes a public/private key pair $y_p$ an $y_s$), typically selecting the private key randomly. The two parties exchange their public keys and then each generate an identical session key, S, as follows:

$$S=y_p^{x_s} \bmod N \text{ (computed by Carol)}$$

$$S=x_p^{y_s} \bmod N \text{ (computed by Steve)}$$

This is usually used as part of a public-key assisted system. Once both sides agree on the session key, a normal login session is performed with all communications being encrypted using the session key as a symmetric encryption key, which protects the password and all other communications from eavesdroppers.

Like any public-key assisted protocol, however, Diffie-Hellman is not secure against active attacks like the "man-in-the-middle" attack, in which an interloper (e.g., Mallory) intercepts all communications between Steve and Carol, conducts a valid-looking session with each, and develops two session keys, one for each party. While Carol and Steve think they are communicating securely with each other, Mallory is actually decrypting and re-encrypting all their communications, including any passwords.

Up until know, attempts at creating a secure, authenticated variant of Dfffie-Hellman have resulted in protocols that are still vulnerable to some form of active attack or that require a high-entropy shared secret. The present invention solves these problems and maintains the user-level convenience necessary to replace the standard login mechanism for most modem operating systems.

SUMMARY OF THE INVENTION

In summary, the present invention is a system and method for a server computer and a login procedure executed by a client host computer to establish a session key in a manner that is secure against both passive and active security attacks, and which utilizes the user's password so as to enable the server to determine whether or not the user in fact knows the password for the usemame account specified by the user during the login process.

Prior to a login session, the server computer stores a password verification value $x_p$ for each of a plurality of authorized users of the server computer. Each user generates a password verification value $x_p$ by applying a first one-way hashing function to a password p specified by the user to generate a secret value $x_s$, and then applying a second one-way function to the secret value $x_s$ to generate $x_p$.

When a client computer attempts to establish a login session between the server computer and client computer, the following steps are performed. The server computer receives a user identifier from the client computer, and retrieves the password verification value stored by the server for the user. The client computer generates a first secret value $w_s$ and then generates a corresponding first public value $w_p$ by applying the second one-way function to the first secret value $w_s$. The client computer sends the first public value $w_p$ to the server computer.

The server computer generates a second secret value $y_s$ and then generates a corresponding second public value $y_p$ by applying the second one-way function to the second secret value $y_s$. The server computer sends the second public value $y_p$ to the client computer. The server computer also generates a server session key K1 by applying a first predefined session key generation function to the first public value $w_p$, the retrieved password verification value $x_p$, and the second secret value $y_s$.

The client computer regenerates the user's secret value $x_s$, and then generates a client session key K2 by applying a second predefined session key generation function to the second public value $y_p$, the first secret value $w_s$, and the regenerated secret value $x_s$.

Then the client and server computers exchange a set of messages so that each can verify that the other computer's session key is equal to its locally generated session key. The login session is established only if the server computer verifies that the server and client session keys match.

BRIEF DESCRIPTION OF THE DRAWINGS

Additional objects and features of the invention will be more readily apparent from the following detailed description and appended claims when taken in conjunction with the drawings, in which:

DESCRIPTION OF THE PREFERRED EMBODIMENTS

Figure 1:
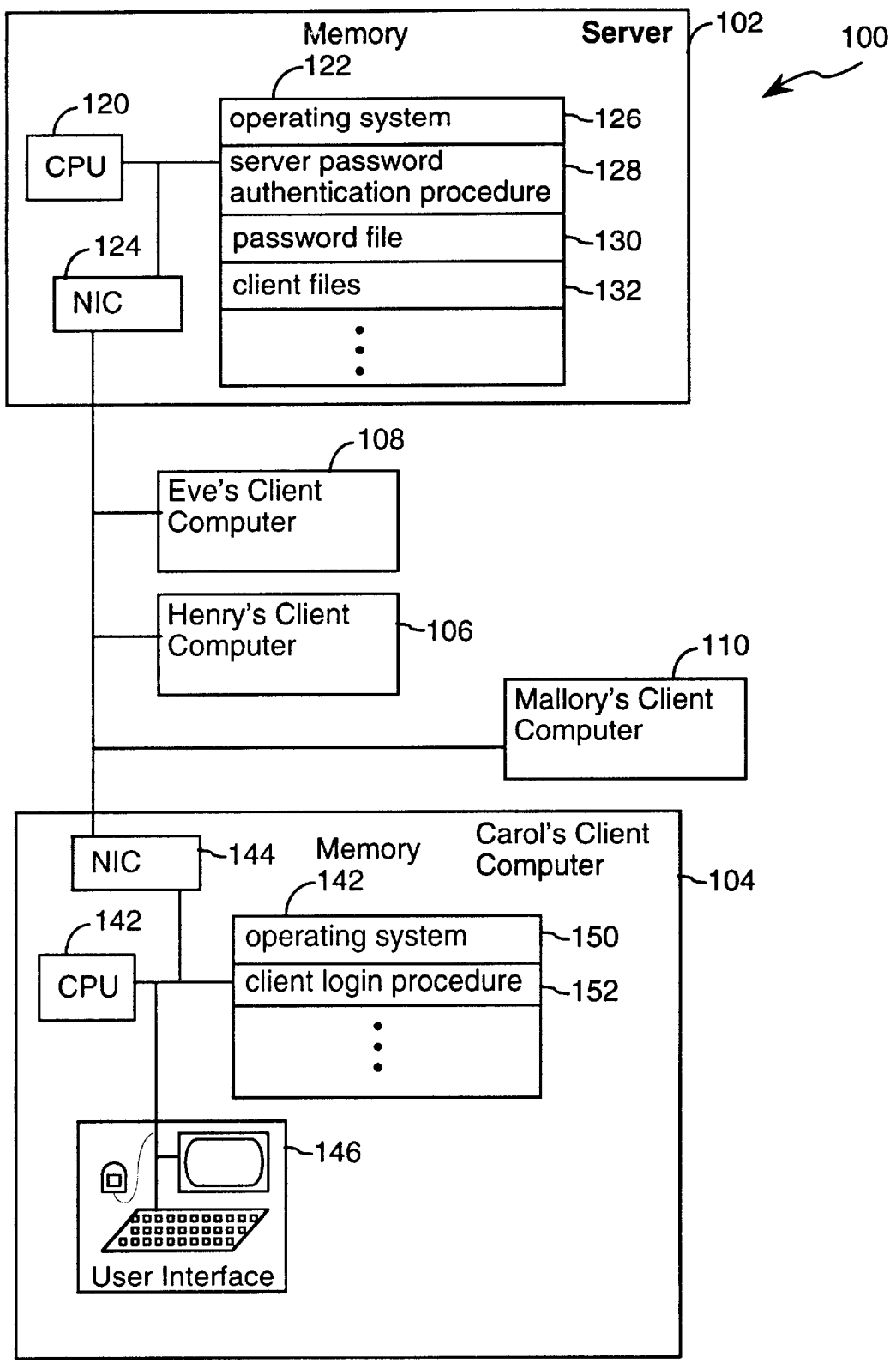
FIG. 1 is a block diagram of a distributed computer system having a server computer and multiple client computers.

The following is the basic set of requirements that is met by the present invention, along with reasons why each one should be considered an essential part of any client-server authentication system:

The protocol must be secure against passive snooping. Monitoring traffic on a public network is one of the easiest attacks an enemy can carry out. The enemy should not be able to deduce either the user's clear text password or in any way obtain information that would allow them access to the server. There are a variety of attacks that can be launched from snooped data; they will be discussed at length.

The protocol must encrypt the login session. Without session encryption, Eve could monitor Carol's keystrokes, and if Carol uses an unencrypted session to log into another host, her password on that host will be compromised. An unencrypted session also invites active, on-line attacks, such as altering input or hijacking sessions.

The protocol must not depend on trusted third parties or central servers. Centralizing authentication of a large number of services increases the amount of damage that can be caused by a security compromise. An additional party also increases the level of complexity involved in installing and maintaining an authentication system.

The protocol must maintain "forward secrecy." This means that a compromise of one part of the system must not lead directly to further compromises. For example, a stolen password must not allow an enemy to decrypt past or present encrypted sessions.

The protocol must not use any persistent storage on the client side. Passwords are inherently portable, since they are memorized by the user, while files are not. A system that requires Carol to have a copy of her personal key file on each client that she uses adds another level of complexity and inconvenience. It also introduces the possibility of internal attacks based on stolen key files. In contrast, a password-only system is easier to use because it does not require manual key-management. It also uses a secret that is less likely to be stolen and easier to change on a regular basis, which is essential for long-term security.

The protocol must not depend on having secure persistent storage on the server side. A secret database or password file is a potential risk no matter how carefully it is administered. Depending on the servers operating system to guard against internal attacks from users who already have system access is at best a dubious strategy and, as stated before, it makes user-level password verification and password-file distribution much more difficult to perform securely. A public password file removes this tempting target. Although the protocol can tolerate a publicly-readable password file, keeping this file private may have security benefits, such as the complete elimination of dictionary attacks from any adversary.

The protocol and any algorithms behind it must be publishable. The security of the protocol must not rest in the secrecy of its inner workings but in the passwords. Only protocols that satisfy this property have been considered in the writing of this document; secret-algorithm schemes for password authentication cannot be considered viable solutions for modem-day needs.

The preferred embodiment of the password authentication method or protocol of the present invention will be called the Secure Remote Password protocol, or SRP, for the remainder of this document.

The following notation will be used in the description of the SRP protocol:

| | |
|---|---|
| p | The user's password |
| s | A random number used as the user's salt |
| $H_1()$, $H_2()$, $H_3()$ | One-way hash functions |
| $E_k(M)$ | The message M encrypted with key k |
| $D_k(M)$ | The same message decrypted with key k |
| N | A large prime number. All computations are performed modulo N. |
| g | A number that generates a large multiplicative group modulo N (often called a generator) |
| x | A private key derived from the password and salt |
| v | The host's password verifier. A distinct value of v is stored in the server password file for each user. |
| u | Random scrambling parameter, publicly revealed. |
| $w_s$, $y_s$ | Secret values, not known to the outside |
| $w_p$, $y_p$ | Public values corresponding to the secret values |
| a, b | The concatenation of two strings, a and b |
| K | Session key |

The number N is a "safe prime," which means that both N and (N−1)/2 are prime. It is recommended that N be sufficiently large to resist discrete-log computation attacks. To achieve a high level of security with respect to computational technology available in the year 1998, N is preferably a number whose binary representation has a length of at least 1024 bits (308 digits). The parameter "g" can be of any size, as long as it is a primitive root modulo N, and it is often set equal to 2 for improved performance.

All numbers are nonnegative integers. It is also noted that while the three one-way hash functions $H_1$, $H_2$ and $H_3$ may be different hash functions, they could also all be same one-way hash function.

The server establishes values of N and g that it will use for all users. Alternatively, individual users might have their own N and g values.

To establish or set a password locally, Carol selects a random salt s and a password p and computes x and v as follows:

$$x = H_1(s,p)$$

$$v = g^x \bmod N$$

The use of a random salt, s, when generating x is optional, but is preferred because it helps to ensure that all passwords values in the password file are unique, even if two users select the identical password.

Carol sends Steve a copy of v, and her salt s, and Steve stores v and s as Carol's public password verifier and salt along with N and g. Carol preferably discards x immediately after generating v because retention of x in her client computer represents an unnecessary security risk, and because x can be easily regenerated by the client side login procedure each time Carol logs onto the server. This initial communication of Carol's password verifier v and salt s to Steve needs to be performed either in person or using any other mechanism by which Steve can be assured that v and s are actually Carol's password verifier and salt (and have not been provided by a possibly hostile third party).

The server (Steve) will reveal Carol's salt s each time Carol logs in, but her password verifier v is preferably kept secret. In the event that the server password file is compromised, the login procedure remains secure, but is more vulnerable to dictionary attacks than if the password verifiers are kept secret.

Logging In

Figure 2:
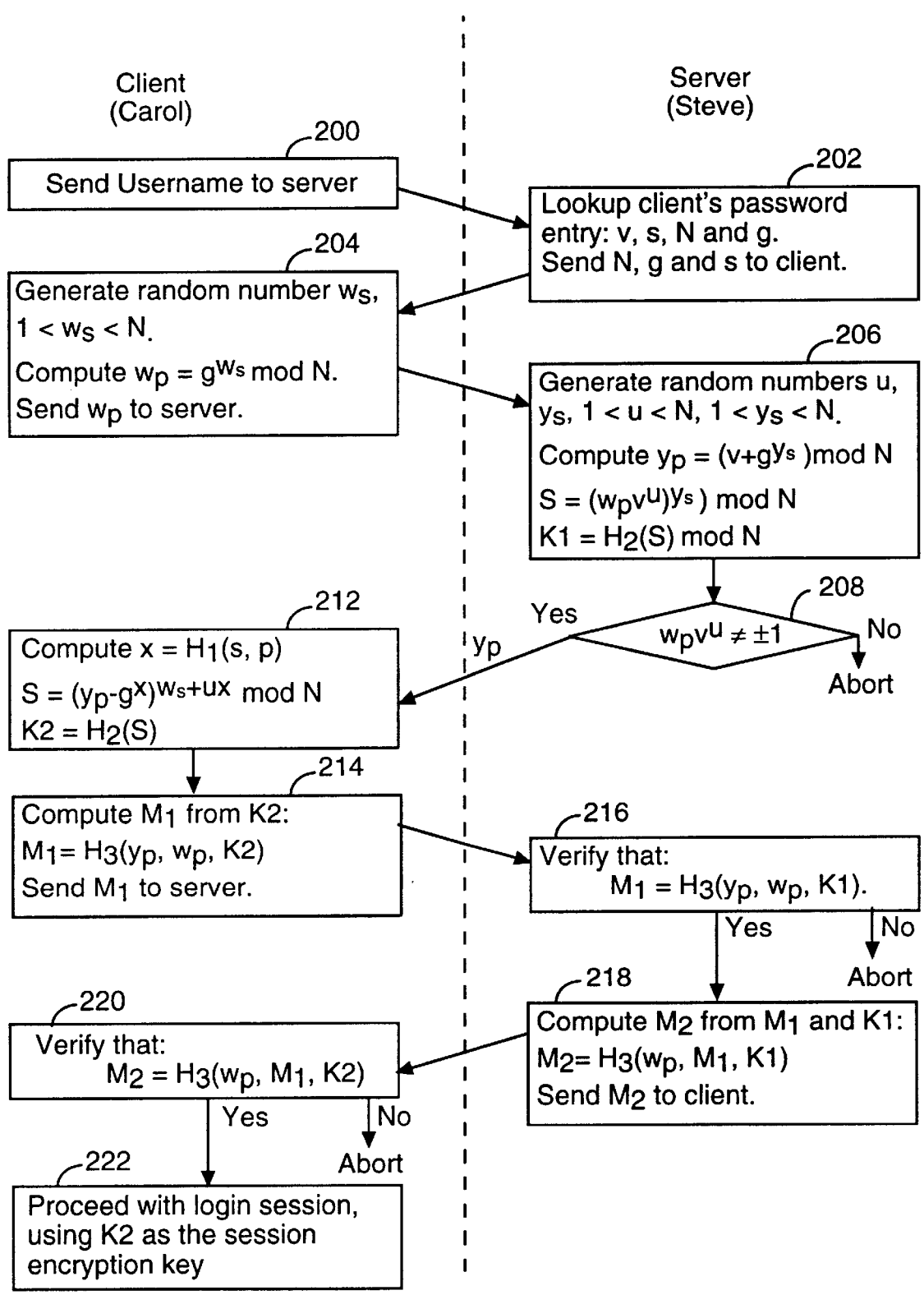
FIG. 2 is a flow chart of a preferred embodiment of a login and password authentication procedure in accordance with the present invention.
Figure 3:
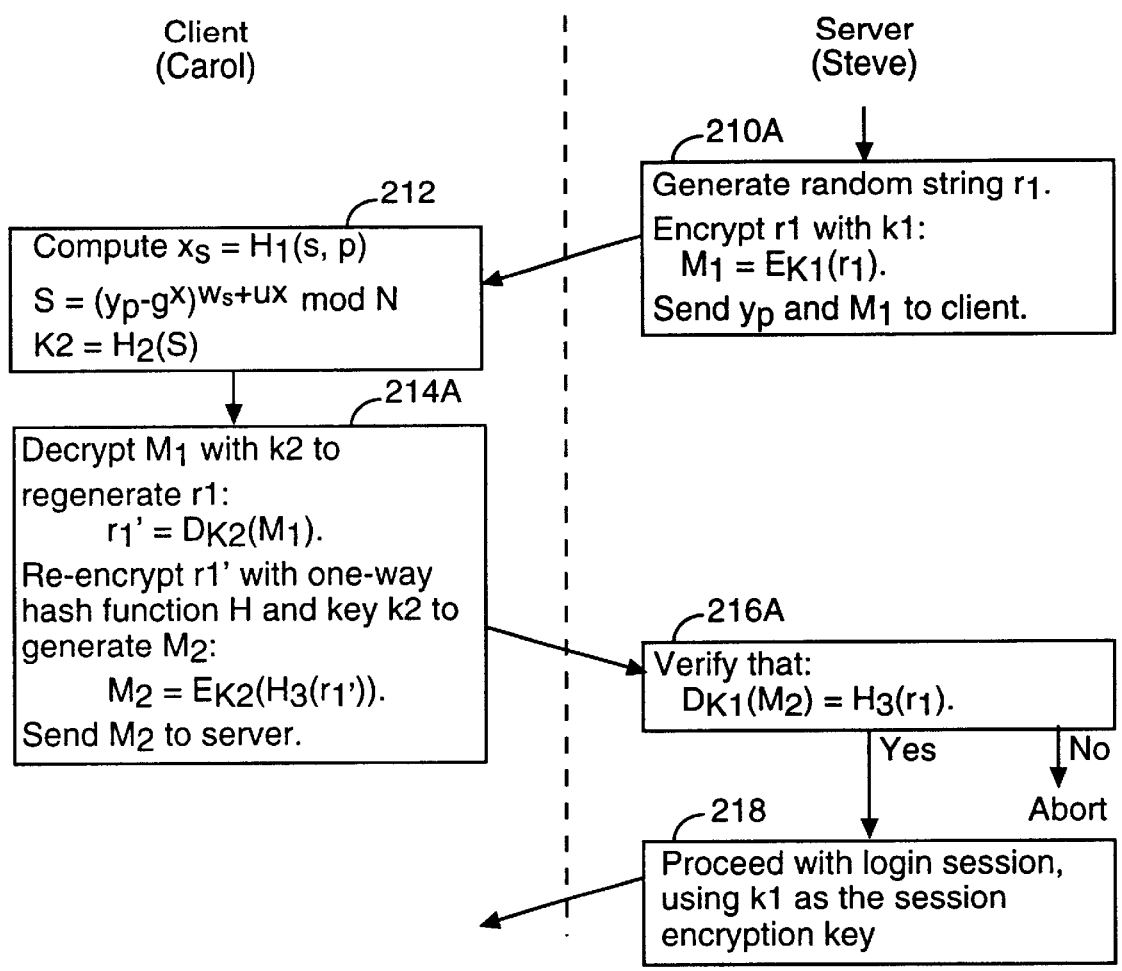
FIG. 3 is a flow chart of an procedure for a server to verify a client computer generated session key.
Figure 4:
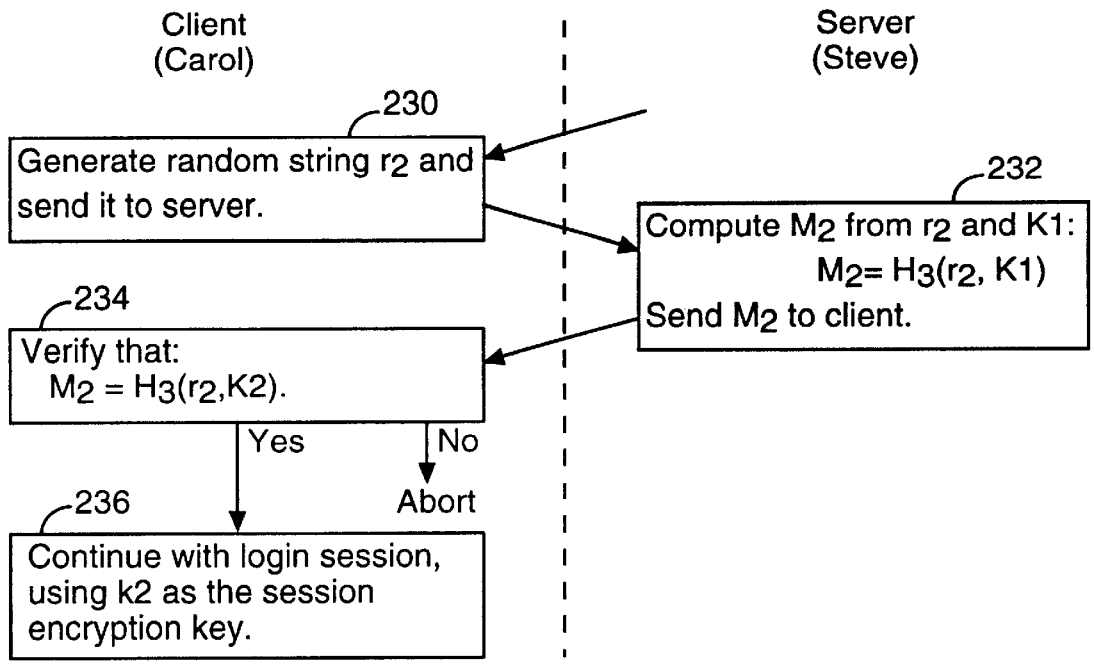
FIG. 4 is a flow chart of a preferred embodiment of an extension to the login and password authentication procedure of FIG. 2.
Figure 5:
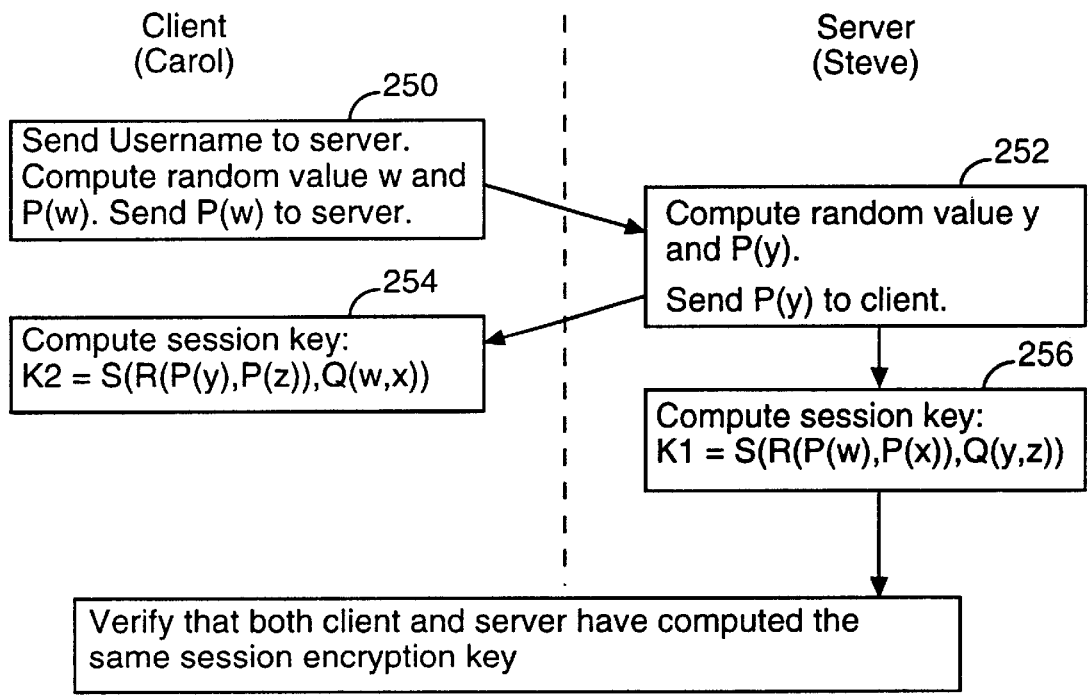
FIG. 5 is a flow chart of a second preferred embodiment of a login and password authentication procedure in accordance with the present invention.

Referring to FIGS. 2, 3, and 4, the following is a step-by-step description of how SRP authenticates a remote login attempt by Carol:

1. Carol sends Steve her username, (e.g. carol) (step 200).
2. Steve looks up Carol's password entry and fetches her password verifier v, salt s, and the associated field parameters N and g. Steve sends N, g and s back to Carol (step 202).

$$\leftarrow N, g, s$$

A left arrow, as shown above will be used to indicate transmission from Steve to Carol, and a right arrow will be used to indicate transmissions from Carol to Steve.

3. Carol generates a random number $w_s$, $1 < w_s < N$, which she keeps secret, and sends Steve the corresponding public value $w_p$ (step 204):

$$w_p = g^{w_s} \bmod N \rightarrow$$

4. Steve receives $w_p$, generates a random number u, $1 < u < N$, and another random number $y_s$, $1 < y_s < N$, which he keeps secret, and computes a public value $y_p$ and an encryption key $K_1$ (step 206) as follows:

$y_p = (v + g^{y_s}) \bmod N$ $S = (w_p v^u)^{y_s} \bmod N$ $K_1 = H_2(S)$

Steve also verifies that $w_p v^u \neq \pm 1$ (step 208). If this is not true, Steve aborts the authentication attempt. A hostile client may try to guess the value of u (which should be impossible unless Steve is not generating u randomly or the client has information about Steve's random number generator that he shouldn't have) and send the server $w_p = \pm v^{-u} \bmod N$, which would result in the session key being $K_1 = H_2(\pm 1)$ regardless of the value of $y_s$. This would allow an imposter client posing as Carol to have his/her "password" authenticated without knowing her private key x.

5. Carol takes the values $y_p$, her password p, and her salt s, and computes her private key x and encryption key $K_2$ (step 212) as follows:

$x = H_1(s, p)$ $S = (y_p - g^x)^{w_s + ux} \bmod N$ $K_2 = H_2(S)$

If Carol's password p matches the one she used to generate her password verifier v, then the session key, $K_2$, she generates will match the session key, $K_1$, generated by Steve.

6. To prove to the server that she has the correct session key, and thus that she is really Carol, Carol generates a predefined message $M_1$ and sends it to Steve (step 214). In one embodiment, the message $M_1$ is generated by hashing the concatenation of the two secret keys $y_p$, $w_p$ and the session key $K_2$:

$M_1 = H_3(y_p, w_p, K_2)$.

7. Steve receives message string $M_1$ and verifies that $M_1 = H_3(y_p, w_p, K_1)$ (step 216). If $M_1 \neq H_3(y_p, w_p, K_1)$, the login session is aborted by Steve because either Carol has forgotten her password or the person communicating with the server is not really Carol.

8. If the value of $M_1$ computed by Steve matches the value he received from Carol, he generates and a predefined message $M_2$ and sends it to Carol to prove that he has the correct session key, and thus that he really is Steve (step 218). In one embodiment, the message $M_2$ is generated by hashing the concatenation of secret key $w_p$, message $M_1$ received from Carol, and the session key $K_1$:

$M_1 = H_3(w_p, M_1, K_1)$.

9. Carol receives message string $M_2$ and verifies that $M_2 = H_3(w_p, M_1, K_2)$ (step 220). If $M_2 \neq H_3(w_p, M_1, K_2)$, the login session is aborted by Carol because either Steve has forgotten her password verifier or the person communicating with Carol is not really Steve. Otherwise (step 222) Carol proceeds with the remainder of the login session using $K_2$ as the session encryption key.

To summarize, the purpose of the $M_1$ and $M_2$ message generating and verification steps 214, 216, 218 and 220 is for the server to verify that the client has computed the same session key as the server, which also authenticates the identity of the client, and for the client to authenticate the identity of the server.

The Role of Random Number u

The reason that the server generates and uses the parameter u in the SRP protocol, even though it is transmitted in the clear to the client, is as follows. Assume that an intruder has knowledge of the client's password verifier v and that he has somehow discovered the value of u as a result of a flaw in the sever's random number generator. Under these circumstances, the intruder can gain access to the server by starting the normal login procedure, pretending to be the client (Carol). At step 3 (step 204 in FIG. 2), the intruder computes the value $A = w_p v^{-u}$ and sends it to the server instead of $w_p$. The server responds by sending $(v + g^{y_s}) \bmod N$ back to the intruder (step 206, FIG. 2).

Then the intruder computes the session key K as $K = H((y_p - v)^{w_s} \bmod N)$ The reason the exponential parameter in this equation for K does not contain "+ux" in it is that value A sent by the intruder to the server at step 3 (step 204 of FIG. 2) eliminated the dependence of the session key from u and v. In other words, if the intruder knows the value of u when he sends his public key to the server at step 3, he can cause the session key to be independent of the actual client's password.

To prevent the intruder from being able to cancel out the client password from the computation of the session key, the server must not reveal the value of u until after he receives the user's public key $w_p$. Since u is communicated publicly, it is possible to piggyback it on top of another public value, thus transmitting it implicitly. For example, both side could compute u as a simple function of $y_p$, in which case the server must wait for the client (or alleged client) to send her public key $w_p$ before he sends by $y_p$ and reveals u. In either case, u=0 must be avoided because that also would make the session key independent of the client's password.

Alternate Session Key Verification Method

Referring to FIG. 3, another way for the server to verify that the client computer has generated the same session key as the server is for the server and client to exchange encrypted messages, each using the session key they have generated as the encryption key. More specifically, in this alternate embodiment, steps 5 through 9 (steps 212–220 in FIG. 2) are replaced with the following sequence of steps.

4A. Steve generates a random string $r_1$, encrypts it with the server generated session key $K_1$ to generate a message string $M_1$, and sends Carol public value $y_p$ and message string $M_1$ (step 210A):

$\leftarrow y_p, M_1 = E_{K_1}(r_1)$

5. The client session key generation step (212) remains unchanged. If Carol's password matches the one she used to generate $x_p$, then $K_2 = K_1$.

6A. Carol decrypts $M_1$ with $K_2$ (hopefully getting $r_1$ back). She then hashes and re-encrypts the message to generate message string $M_2$ and sends it back to Steve (step 214A).

$M_2 = E_{K_2}(H_3(D_{K_2}(M_1))) \rightarrow$

7A. Steve receives message string $M_2$ and verifies that $D_{K_1}(M_2) = H_3(r_1)$ (step 216A). If they match, then he proceeds with Carol's login session (step 218).

Client Side Authenticity Check

Referring to FIG. 4, as an optional safeguard Carol can also perform an authenticity check, sending Steve an encrypted nonce $E_{k_2}(r_2)$ and seeing if he returns $E_{k_2}(H(r_2))$ correctly. If he does, Carol continues with the login, using $k_2$ as the session encryption key.

More specifically, Carol generates a random string $r_2$ and sends it to the server, Steve (step 230).

Steve concatenates the random string $r_2$ and the session key $K_1$ which he previously generated, and hashes the resulting string with the $H_3(\ )$ hash function to generate message string $M_2$.

$$M_2 = H_3(r_2, K_1)$$

Steve then sends message string $M_2$ to Carol (step 232).

Next, Carol verifies that the message string $M_2$ sent by Steve is equal to $H_3(r_2, K_2)$ (step 234). If they match, then she proceeds with the login session, using $K_2$ as the session encryption key (step 236).

It should be understood that the client side authentication steps 230, 232, 234, 236 only verify that the server has computed the same session key as the client (i.e., it confirms that the server knows the client's password verifier v and salt s). If the password file on Steve's server is publicly readable, these steps cannot authenticate that the party with whom Carol is communicating is actually Steve's server because it is possible for another party to impersonate Steve's server without Carol being able to detect that fact, at least during the login procedure. If the password file is protected from public access, then the client side authentication steps 230, 232, 234, 236 do establish the identity of the server.

Another way for the server to verify that the client has the same session key as the server, would be for the client to simply hash the client generated session key $K_2$ with a hash function $H_3(\ )$ and send it to the server, who would then compare that value with the hash of the server generated session key $K_1$. While this alternate session key authentication technique is slightly simpler than the technique described above with reference to FIGS. 2 and 3, this technique cannot be used by both parties to verify the other's session key (because one party could simply send back the hashed session key he received from the other party). Thus, if both parties are to verify the other's session key, at least one of the two verification messages will need to be based on a combination of the session key and another (preferably randomly generated) value.

Changing a Password

To change her password remotely, Carol would simply go through steps 1 through 9 to prove to Steve that she knew her old password. Then, the remaining steps would be:

10. Steve sends Carol the current set of parameters:

$$\leftarrow N', g'$$

Note that these values may be different from the ones used to authenticate Carol originally.

11. Carol takes her new password, p' and computes $$x' = H(s, p')$$
$$v' = (g')^{x'} \bmod N'$$

12. Carol then combines the new public key v' and the hash of v' and encrypts it all with the session key $K_1$. She sends this whole package to Steve:

$$M_p = E_{k_1}(H(v'), v') \rightarrow$$

13. Steve decrypts $M_p$ with $K_1$, extracts $H(v')$ and v', and checks to see that v' does indeed hash to the supplied value of $H(v')$. If so, he updates Carol's password entry with v'.

Mutual Authentication Variant

Executing Carol's side of the protocol requires knowledge of the secret value x, but executing Steve's side only requires knowledge of the potentially public value v. The SRP protocol can be strengthened by assigning a public/private key pair $z_s$, $z_p$ to each host, where $z_s < N$ and $$z_p = g^{z_s} \bmod N$$

Steve generates $z_s$, keeps it in a safe place, and publicizes the corresponding $z_p$. When Carol logs into Steve's host, she obtains the value $z_p$ for that host, perhaps through some directory service or even by having it compiled into her client software. To compute the session key $K_1$ in Step 4 (step 206 of FIG. 2), Steve now calculates:

$$K_1 = H((w_p v^u)^{y_s + z_s} \bmod N)$$

while Carol changes the computation in Step 6 (step 212 of FIG. 2) to:

$$K_2 = H(((y_p - g^x) z_p)^{w_s + ux} \bmod N)$$

The remainder of the protocol is unchanged.

The main advantage of this variant is that mutual authentication can be achieved even when the password file is made public. The server need only secure the private value $z_s$. However, the public value $z_p$ must now be made available to clients, which presents exactly the kind of problem that SRP was designed to avoid, namely that of client-side key and certificate management. In practice, mutual authentication can still be obtained by securing the password file containing the values of $x_p$, so the main benefit of this variant would really be centralizing the server's secret information. The mutual authentication variant also will not work in its present form if different users are allowed to have different N and g parameter values.

This variant will not be considered further in this document.

Session Key Agreement

The values $w_s$ and $w_p$ can be thought of as two halves of a client-generated salt, and $y_s$ and $y_p$ two halves of a server-generated salt. The asymmetry is in the handling of x and v, which are based on Carol's password.

Steve gets the "public" half v, while Carol keeps the "private" half x, only revealing it within the confines of volatile memory in her SRP login client software. Because of the way in which the three pairs of values are combined at either end, Steve doesn't need to know x, but he can pose a challenge using v that requires Carol to know x. From a mathematical standpoint, the two parties can agree on a key because $$K_1 = K_2 = H_2(g^{y_s(w_s + ux)} \bmod N)$$

after substituting for $w_p$, $x_p$, and $y_p$ in the equations for $K_1$ and $K_2$. This holds true if and only if Carol provides the correct value of x on her side of the connection; she cannot construct the correct shared session key without it.

Upon determining the session key, Carol and Steve can destroy their copies of $w_s$, x and $y_s$ in memory. Note that not even the hashed version of the password ever sees the network or any kind of persistent storage during the login process.

The password change mechanism is designed to protect the contents of the password change transaction from either accidental or malicious alteration. The combination of a hash and encryption makes it nearly impossible for an intruder to alter the new public password key without being detected by Steve.

While the main purpose of encrypting the password change is to ensure message integrity, it also has the side effect of hiding the new public password key from snoopers. More specifically, even if Eve knew Carol's current password, she could not obtain Carol's new password by decrypting the contents of the password change, since it only contains v' and not x' or p' in any form.

Security Analysis

The present invention (the preferred embodiment of which is described above) is based loosely on the Diffie-Hellman key exchange protocol, and preliminary cryptanalysis has shown that the security of the two methods are closely related. Specifically, the difficulty of conducting a dictionary attack against the present invention is known to be at least as hard as compromising one Diffie-Heliman exchange in the same multiplicative group.

Despite extensive public peer review of the present invention, no successful attacks, either passive or active, have been found against the full protocol, assuming that all conditions and precautions are properly observed. The novel approach of using a key exchange protocol directly to achieve authentication is partially responsible for the cryptographic strength of this method.

Real-World Applicability

The standard Unix password scheme has survived for a long time despite its lack of security in a networked environment. It has done so primarily because it is simple, convenient, and easy-to-understand from a user's standpoint. System administrators like it because it is easy to set up and trivial to administer. While attempts have been made in the past to fix its obvious insecurities, they have always come at the expense of convenience. Understandably, the majority of vendors and administrators have been reluctant to adopt anything that would make a system more difficult to use.

Since SRP meets all seven of the requirements discussed above, it could potentially replace the standard Unix login system, raising the level of system security without sacrificing the external simplicity that users have come to expect.

Generalization of SRP Protocol

The SRP protocol can be generalized as follows. The following notation will be used in the description of the generalized SRP protocol, herein called the Authenticated Key Exchange (or AKE) protocol:

| | |
|---|---|
| w, x, y, z | Arbitrary parameters |
| P(x) | A one-way hash function |
| Q(x,y), R(x,y) | "Mixing" functions |
| S(x,y) | The session key generation function |
| $K_1$, $K_2$ | Session keys |

No assumptions are made about the domain, range or input/output types of the functions listed above, except that for all w, x, y and z $$S(R(P(w),P(x),Q(y,z))=S(R(P(y),P(z),Q(w,x))$$

The above equation must be satisfied for AKE to work properly. However, by itself, this property guarantees nothing about the security of the AKE protocol.

To set things up for the AKE protocol, Carol and Steve select parameters x and z, respectively. These serve as the passwords in the protocol. Carol computes P(x) and gives it to Steve, and Steve computes P(z) and gives it to Carol. Carol and Steve are now ready to use AKE to exchange keys using the following steps.

These initial communications of Carol's and Steve's public keys P(x) and P(z) need to be performed either in person or using any other mechanism by which they can be assured that public values have actually been provided by the appropriate parties. Also, it is assumed that Carol and Steve durably store the other's public key value and remember their respective passwords (but preferably don't store the passwords on their respective computers). However, as noted below, the server's parameter z and public key P(z) can be replaced by fixed publicly available values, such as 0 and 1, eliminating one half of the public key exchange requirement.

After these initial preparations have been performed, subsequent login sessions can be conducted as follows (see FIG. 4):

1. Carol identifies herself to Steve (i.e., sends Steve her username), computes a random parameter w, computes P(w), and sends P(w) to Steve (step 250).
2. Steve computes a random parameter y, computes P(y), and sends P(y) to Carol (step 252).
3. Carol computes her session key (step 254)

$$K2=S(R(P(y),P(z)), Q(w,x))$$

Note that P(z) is the value previously sent by Steve to Carol before the login session, P(y) is the value sent by Steve to Carol at step 2, w is the random parameter computed by Carol at step 1, and x is Carol's password, which she is presumed to remember.

4. Steve computes his session key (step 256)

$$K_1=S(R(P(w),P(x)), Q(y,z))$$

Note that P(x) is the value previously sent by Carol to Steve before the login session, P(w) is the value sent by Carol to Steve at step 1, y is the random parameter computed by Steve at step 2, and z is Steve's password, which he is presumed to remember.

At this point, Carol and Steve and performed the basic AKE protocol and have their respective session keys. If the values of x and z used to compute the session key correspond to the previously agreed-to values of P(x) and P(z), then $K_1$ will be equal to $K_2$.

To complete the authentication process, Carol and Steve can use any mutually agreeable method to verify that their keys match. The security of the resulting protocol is dependent on the choice of this method. In a preferred embodiment, the session key match verification steps for AKE are the same as those described above for the SRP method.

In the AKE protocol, x and z are the long-term secrets held by the two parties, while w and y are ephemeral parameters generated by each side to ensure that the session key varies from session to session. The security of AKE depends on the P( ), Q( ), R( ) and S( ) functions it uses. P( ) must be difficult to invert, and its output should reveal little or no information about its input. The same can be said for S( ); it should be chosen to especially protect its second argument from leakage. Additionally, it should be infeasible to reconstruct either $K_1$ or $K_2$ using only P(w), P(x), P(y) and P(z). No closed-form expression that does this should exist, and ideally we would like this to be as difficult as inverting P( ).

In a preferred embodiment, the server's secret password value z is set permanently to an arbitrary value, such as 0, and the servers public password value P(z) is permanently set to a corresponding value, such as 1. This eliminates the need for the server to securely store a secret value and also eliminates the need for the client computer to durably store any server key values.

The SRP protocol is one example of an implementation of the AKE protocol when (A) the server's secret password value z is set permanently to an arbitrary value, such as 0, and the server's public password value P(z) is permanently set to a corresponding value, such as 1, and (B) the following function substitutions are made:

$$P(x) = g^x \bmod N$$
$$Q(w,x) = (w+ux) \bmod N$$
$$R(w,x) = w \cdot x^u \bmod N$$
$$S(w,x) = w^x \bmod N$$

where g is a generator value and N is a large prime number.

While the present invention has been described with reference to a few specific embodiments, the description is illustrative of the invention and is not to be construed as limiting the invention. Various modifications may occur to those skilled in the art without departing from the true spirit and scope of the invention as defined by the appended claims. For instance, the present invention (e.g., as explained above with respect to the AKE protocol) can be implemented using alternative mathematical groups, such as elliptic curves, to produce a secure authentication protocol.

What is claimed is:

1. A method of establishing a login session between a server computer and a client computer such that the login session is permitted when a server computer session key $K_1$ matches a client computer session key $K_2$, comprising the steps performed by the server computer of:

prior to a login session, storing a respective password verification value v for each of a plurality of authorized users of the server computer;

receiving a user identifier from the client computer, and retrieving the password verification value v;

receiving from the client computer a public value $w_p$;

generating a secret value $y_s$ and generating a corresponding public value $y_p$ by applying a predefined one-way function to the secret value $y_s$, and sending the public value $y_p$ to the client computer; and generating a server session key $K_1$ by applying a predefined session key generation function to the public value $w_p$, the password verification value v, and the secret value $y_s$, said server session key $K_1$ is generated from a single stage communication with said client computer.

2. The method of claim 1, including:

generating a random number u and sending the random number u to the client computer after receiving from the client computer the public value $w_p$; and the step of generating server key $K_1$ including applying the predefined session key generation function to the public value $w_p$, the password verification value v, the secret value $y_s$ and the random number u.

3. A method of establishing a login session between a server computer and a client computer such that the login session is permitted when a server computer session key $K_1$ matches a client computer session key $K_2$, comprising the steps performed by the server computer of:

prior to a login session, storing a respective password verification value v for each of a plurality of authorized users of the server computer;

receiving a user identifier from the client computer, and retrieving the password verification value v;

receiving from the client computer a public value $w_p$;

generating a secret value $y_s$ and generating a corresponding public value $y_p$ by applying a predefined one-way function to the secret value $y_s$, and sending the public value $y_p$ to the client computer;

generating a server session key $K_1$ by applying a predefined session key generation function to the public value $w_p$, the password verification value v, and the secret value $y_s$;

generating a random number u and sending the random number u to the client computer after receiving from the client computer the public value $w_p$; and the step of generating server key $K_1$ including applying the predefined session key generation function to the public value $w_p$, the password verification value v, the secret value $y_s$ and the random number u, wherein the predefined session key generation function is $$K_1 = H_2((w_p v^u)^{y_s} \bmod N)$$

where H2 is a one way hash function and N is a prime number.

4. A method of establishing a login session between a server computer and a client computer such that the login session is permitted when a server computer session key $K_1$ matches a client computer session key $K_2$, comprising the steps performed by the server computer of:

prior to a login session, storing a respective password verification value v for each of a plurality of authorized users of the server computer;

receiving a user identifier from the client computer, and retrieving the password verification value v;

receiving from the client computer a public value $w_p$;

generating a secret value $y_s$ and generating a corresponding public value $y_p$ by applying a predefined one-way function to the secret value $y_s$, and sending the public value $y_p$ to the client computer; and generating a server session key $K_1$ by applying a predefined session key generation function to the public value $w_p$, the password verification value v, and the secret value $y_s$, wherein the predefined one-way function, as applied to the secret value $y_s$, in step of generating the public value $y_p$ comprises:

$$y_p = (v + g^{y_s}) \bmod N$$

wherein N is a prime number and g is a generator number having a large multiplicative group modulo N.

5. The method of claim 4, wherein the password verification value v is not sent to the client computer, and the secret value $y_s$ is not sent to the client computer.

6. A method of establishing a login session between a server computer and a client computer such that the login session is permitted when a server computer session key $K_1$ matches a client computer session key $K_2$, comprising the steps performed by the client computer of:

receiving a user identifier, wherein the user identifier identifies a user;

sending the user identifier to a server computer;

generating a secret value w, and generating a corresponding public value $w_p$ by applying a predefined one-way function to the secret value $w_s$, and sending the public value $w_p$ to the server computer;

receiving a public value $y_p$ from the server computer, and generating a secret value x corresponding to the password p specified by the user, generating a client session key $K_2$ by applying a predefined session key generation function to the public value $y_p$, the secret value $w_s$, and the secret value x, said client session key $K_2$ is generated from a single stage communication with said server computer.

7. The method of claim 6, including:

receiving a random number u from the server computer after sending the public value $w_p$ to the server computer; and the step of generating client key $K_2$ by applying the predefined session key generation function to the public value $y_p$, the secret value $w_s$, the secret value x, and the random number u.

8. A method of establishing a login session between a server computer and a client computer such that the login session is permitted when a server computer session key $K_1$ matches a client computer session key $K_2$, comprising the steps performed by the client computer of:

receiving a user identifier, wherein the user identifier identifies a user;

sending the user identifier to a server computer;

generating a secret value $w_s$ and generating a corresponding public value $w_p$ by applying a predefined one-way function to the secret value $w_s$, and sending the public value $w_p$ to the server computer;

receiving a public value $y_p$ from the server computer;

generating a secret value x corresponding to the password p specified by the user, generating a client session key $K_2$ by applying a predefined session key generation function to the public value $y_p$, the secret value $w_s$, and the secret value x;

receiving a random number u from the server computer after sending the public value $w_p$ to the server computer; and the step of generating client key $K_2$ by applying the predefined session key generation function to the public value $y_p$, the secret value $w_s$, the secret value x, and the random number u;

wherein the predefined session key generation function is $K_2=H_2((y_p-g^x)^{w+ux} \mod N)$.

9. A method of establishing a login session between a server computer and a client computer such that the login session is permitted when a server computer session key $K_1$ matches a client computer session key $K_2$, comprising the steps performed by the client computer of:

receiving a user identifier, wherein the user identifier identifies a user;

sending the user identifier to a server computer;

generating a secret value $w_s$ and generating a corresponding public value $w_p$ by applying a predefined one-way function to the secret value $w_s$, and sending the public value $w_p$ to the server computer;

receiving a public value $y_p$ from the server computer; and generating a secret value x corresponding to the password p specified by the user, generating a client session key $K_2$ by applying a predefined session key generation function to the public value $y_p$, the secret value $w_s$, and the secret value x, wherein the predefined one-way function, as applied to the secret value $w_s$, in step of generating the public value $w_p$ comprises:

$$w_p=(g^{w_s}) \mod N$$

wherein N is a prime number and g is a generator parameter having a large multiplicative group modulo N.

10. The method of claim 9, wherein password p is not sent to the server computer, the generated secret value x is not sent to the server computer, and the secret value $w_s$ is not sent to the server computer.

11. A computer program product for use in conjunction with a server computer system when establishing a login session between the server computer and a client computer, the computer program product comprising a computer readable storage medium and a computer program mechanism embedded therein, the computer program mechanism comprising:

a server side login procedure, including:

instructions for storing a respective password verification value v for each of a plurality of authorized users of the server computer;

instructions for receiving a user identifier from the client computer, and retrieving the password verification value stored by the server for the user corresponding to the received user identifier;

instructions for receiving from the client computer a public value $w_p$;

instructions for generating a secret value $y_s$ and generating a corresponding public value $y_p$, by applying a predefined one-way function to the secret value $y_s$, and sending the public value $y_p$ to the client computer; and instructions for generating a server session key $K_1$ by applying a predefined session key generation function to the public value $w_p$, the retrieved password verification value v, and the secret value $y_s$, said server session key $K_1$ is generated from a single stage communication with said client computer.

12. The computer program product of claim 11, wherein the server side login procedure including instructions for generating a random number u and sending the random number u to the client computer after receiving from the client computer the public value $w_p$; and the instructions for generating server key $K_1$ including instructions for applying the predefined session key generation function to the public value $w_p$, the retrieved password verification value v, the secret value $y_s$ and the random number u.

13. A computer program product for use in conjunction with a server computer system when establishing a login session between the server computer and a client computer, the computer program product comprising a computer readable storage medium and a computer program mechanism embedded therein, the computer program mechanism comprising:

a server side login procedure, including:

instructions for storing a respective password verification value v for each of a plurality of authorized users of the server computer;

instructions for receiving a user identifier from the client computer, and retrieving the password verification value stored by the server for the user corresponding to the received user identifier;

instructions for receiving from the client computer a public value $w_p$;

instructions for generating a secret value $y_s$ and generating a corresponding public value $y_p$ by applying a predefined one-way function to the secret value $y_s$, and sending the public value $y_p$ to the client computer;

instructions for generating a server session key $K_1$ by applying a predefined session key generation function to the public value $w_p$, the retrieved password verification value v, and the secret value $y_s$;

the server side login procedure including instructions for generating a random number u and sending the random number u to the client computer after receiving from the client computer the public value $w_p$; and the instructions for generating server key $K_1$ including instructions for applying the predefined session key generation function to the public value $w_p$, the retrieved password verification value v, the secret value $y_s$ and the random number u, wherein the predefined session key generation function is $$K_1 = H_2((w_p v^u)^{y_s} \bmod N)$$

where $H_2$ is a one way hash function and N is a prime number.

14. A computer program product for use in conjunction with a server computer system when establishing a login session between the server computer and a client computer, the computer program product comprising a computer readable storage medium and a computer program mechanism embedded therein, the computer program mechanism comprising:

a server side login procedure, including:

instructions for storing a respective password verification value v for each of a plurality of authorized users of the server computer;

instructions for receiving a user identifier from the client computer, and retrieving the password verification value stored by the server for the user corresponding to the received user identifier;

instructions for receiving from the client computer a public value $w_p$;

instructions for generating a secret value $y_s$ and generating a corresponding public value $y_p$ by applying a predefined one-way function to the secret value $y_s$, and sending the public value $y_p$ to the client computer; and instructions for generating a server session key $K_1$ by applying a predefined session key generation function to the public value $w_p$, the retrieved password verification value v, and the secret value $y_s$, wherein the predefined one-way function, as applied to the secret value $y_s$, in step of generating the public value $y_p$ comprises:

$$y_p = (v + g^{y_s}) \bmod N$$

wherein N is a prime number and g is a generator parameter having a large multiplicative group modulo N.

15. A method of establishing a login session between a server computer and a client computer such that the login session is permitted when a server computer session key $K_1$ matches a client computer session key $K_2$, comprising:

the server computer, prior to a login session, storing a respective password verification value v for each of a plurality of authorized users of the server computer;

the client computer, receiving a user identifier identifying a user;

the client computer, sending the user identifier to a server computer the server computer, receiving a user identifier from the client computer, and retrieving the password verification value v corresponding to the received user identifier;

the client computer, generating a secret value $w_s$ and generating a corresponding public value $w_p$ by applying a predefined one-way function to the secret value $w_s$, and sending the public value $w_p$ to the server computer;

the server computer, receiving from the client computer the public value $w_p$;

the server computer, generating a secret value $y_s$ and generating a corresponding public value $y_p$ by applying a predefined one-way function to the secret value $y_s$, and sending the public value $y_p$ to the client computer;

the client computer, receiving from the server computer the public value $y_p$;

the server computer, generating a server session key $K_1$ by applying a first predefined session key generation function to the public value $w_p$, the password verification value v, and the secret value $y_s$, said server session key $K_1$ is generated from a single stage communication with said client computer;

the client computer, receiving a password p from the user; and the client computer, generating a client session key $K_2$ by applying a second predefined session key generation function to the public value $y_p$, the password p, and the secret value $w_s$.

16. A method of establishing a login session between a server computer and a client computer such that the login session is permitted when a server computer session key $K_1$ matches a client computer session key $K_2$, comprising:

the server computer, prior to a login session, storing a respective password verification value v for each of a plurality of authorized users of the server computer;

the client computer, receiving a user identifier identifying a user;

the client computer, sending the user identifier to a server computer the server computer, receiving a user identifier from the client computer, and retrieving the password verification value v corresponding to the received user identifier;

the client computer, generating a secret value $w_s$ and generating a corresponding public value $w_p$ by applying a predefined one-way function to the secret value $w_s$, and sending the public value $w_p$ to the server computer;

the server computer, receiving from the client computer the public value $w_p$;

the server computer, generating a secret value $y_s$ and generating a corresponding public value $y_p$ by applying a predefined one-way function to the secret value $y_s$, and sending the public value $y_p$ to the client computer;

the client computer, receiving from the server computer the public value $y_p$;

the server computer, generating a server session key $K_1$ by applying a first predefined session key generation function to the public value $w_p$, the password verification value v, and the secret value $y_s$;

the client computer, receiving a password p from the user;

the client computer, generating a client session key $K_2$ by applying a second predefined session key generation function to the public value $y_p$, the password p, and the secret value $w_s$;

the server computer, sending a session key challenge to the client computer;

the client computer, responding to the session key challenge by sending the server computer a message value M1;

the server computer, receiving the message value M1; and the server computer, verifying the message value M1 and preventing a login session from being established with the client computer if the message value M1 is not verified.

17. The method of claim 16, including:

generating a random number u and sending the random number u to the client computer after receiving from the client computer the public value $w_p$;

the step of generating server key $K_1$ including applying the first predefined session key generation function to the public value $w_p$, the password verification value v, the secret value $y_s$ and the random number u; and the step of generating client key $K_2$ by applying the second predefined session key generation function to the public value $y_p$, the secret value $w_s$, and the secret value x.

18. The method of claim 17, wherein the random number u represents a hash of $y^p$.

19. The method of claim 17, wherein the first predefined session key generation function is $$K_1 = H_2((w_p v^u)^{y_s} \bmod N)$$

where $H_2$ is a one way hash function and N is a prime number.

20. The method of claim 19, wherein the second predefined session key generation function is $K_2 = H_2((y_p - g^x)^{w_s + ux} \bmod N)$.

21. A method of establishing a login session between a server computer and a client computer such that the login session is permitted when a server computer session key $K_1$ matches a client computer session key $K_2$, comprising the steps performed by the server computer of:

prior to a login session, storing a respective password verification value v for each of a plurality of authorized users of the server computer;

receiving a user identifier from the client computer, and rieving the password verification value v;

receiving from the client computer a public value $w_p$;

generating a secret value $y_s$ and generating a corresponding public value $y_p$ by applying a predefined one-way function to the secret value $y_s$, and sending the public value $y_p$ to the client computer;

generating a server session key $K_1$ by applying a predefined session key generation function to the public value $w_p$, the password verification value v, and the secret value $y_s$;

sending a session key challenge to the client computer;

receiving from the client computer a message value M1; and verifying the message value M1 and preventing a login session from being established with the client computer if the message value M1 is not verified.

22. A method of establishing a login session between a server computer and a client computer such that the login session is permitted when a server computer session key $K_1$ matches a client computer session key $K_2$, comprising the steps performed by the client computer of:

receiving a user identifier, wherein the user identifier identifies a user;

sending the user identifier to a server computer;

generating a secret value $w_s$ and generating a corresponding public value $w_p$ by applying a predefined one-way function to the secret value $w_s$, and sending the public value $w_p$ to the server computer;

receiving a public value $y_p$ from the server computer; and generating a secret value x corresponding to the password p specified by the user, generating a client session key $K_2$ by applying a predefined session key generation function to the public value $y_p$, the secret value $w_s$, and the secret value x;

receiving a session key challenge from the server computer;

generating a message value M1 in response to the session key challenge; and sending the message value M1 to the server computer.

23. A method of establishing a login session between a server computer and a client computer, comprising the steps of:

prior to a login session, storing in the server computer a respective password verification value v for each of a plurality of authorized users of the server computer, wherein the password verification value v for each authorized user is generated by applying a predefined one-way function to a secret value x corresponding to a password p specified by the authorized user;

when a client computer attempts to establish a login session between the server; computer and client computer;

at the server computer, receiving a user identifier from the client computer, and retrieving the password verification value stored by the server for the user corresponding to the received user identifier;

at the client computer, generating a secret value $w_s$ and generating a corresponding public value $w_p$ by applying a predefined one-way function to the secret value $w_s$, and sending the public value $w_p$ to the server computer;

at the server computer, generating a secret value $y_s$ and generating a corresponding public value $y_p$ by applying the predefined one-way function to the secret value $y_s$, and sending the public value $y_p$ to the client computer;

at the server computer, generating a server session key $K_1$ by applying a first predefined session key generation function to the public value $w_p$, the retrieved password verification value v, and the secret value $y_s$;

at the client computer, regenerating the secret value x corresponding to the password p specified by the authorized user, generating a client session key $K_2$ by applying a second predefined session key generation function to the public value $y_p$, the secret value $w_s$, and the regenerated secret value x;

at the server computer, sending a session key challenge to the client computer;

at the client computer, responding to the session key challenge by generating a message value M1 by applying a predefined session key verification function to the client session key $K_2$ and sending the message value M1 to the server computer; and at the server computer, verifying the message value M1 and preventing a login session from being established with the client computer if the message value M1 is not verified;

at the server computer, generating a random number u and sending the random number u to the client computer after receiving from the client computer the public value $w_p$;

the step of generating server key $K_1$ including applying the first predefined session key generation function to the public value $w_p$, the retrieved password verification value v, the secret value $y_s$ and the random number u;

wherein the first predefined session key generation function is $$K_1 = H_2((w_p v^u)^{y_s} \bmod N)$$

where $H_2$ is a one way hash function and N is a prime number; and wherein the second predefined session key generation function is $$K_2 = H_2((y_p - g^x)^{w_s + ux} \bmod N).$$

24. A method of establishing a login session between a server computer and a client computer such that the login session is permitted when a server computer session key $K_1$ matches a client computer session key $K_2$, comprising:

the server computer, prior to a login session, storing a respective password verification value v for each of a plurality of authorized users of the server computer;

the client computer, receiving a user identifier identified a user;

the client computer, sending the user identifier to a server computer the server computer, receiving a user identifier from the client computer, and retrieving the password verification value v corresponding to the received user identifier;

the client computer, generating a secret value $w_s$ and generating a corresponding public value $w_p$ by applying a predefined one-way function to the secret value $w_s$, and sending the public value $w_p$ to the server computer;

the server computer, receiving from the client computer the public value $w_p$;

the server computer, generating a secret value $y_s$ and generating a corresponding public value $y_p$ by applying a predefined one-way function to the secret value $y_s$, and sending the public value $y_p$ to the client computer;

the client computer, receiving from the server computer the public value $y_p$;

the server computer, generating a server session key $K_1$ by applying a first predefined session key generation function to the public value $w_p$, the password verification value v, and the secret value $y_s$;

the client computer, receiving a password p from the user; and the client computer, generating a client session key $K_2$ by applying a second predefined session key generation function to the public value $y_p$, the password p, and the secret value $w_s$, wherein the predefined one-way function, as applied to the secret value $w_s$, in step of generating the public value $w_p$ comprises:

$$w_p = (g^{w_s}) \bmod N$$

wherein N is a prime number and g is a generator parameter having a large multiplicative group modulo N.

25. The method of claim 24, wherein the predefined one-way function, as applied to the secret value $y_s$, in step of generating the public value $y_p$ comprises:

$$y_p = (v + g^{y_s}) \bmod N$$

wherein N is a prime number and g is a generator number having a large multiplicative group modulo N.

26. A method of establishing a login session between a server computer and a client computer such that the login session is permitted when a server computer session key $K_1$ matches a client computer session key $K_2$, comprising:

the server computer, prior to a login session, storing a respective password verification value v for each of a plurality of authorized users of the server computer;

the client computer, receiving a user identifier identifying a user;

the client computer, sending the user identifier to a server computer the server computer, receiving a user identifier from the client computer, and retrieving the password verification value v corresponding to the received user identifier;

the client computer, generating a secret value $w_s$ and generating a corresponding public value $w_p$ by applying a predefined one-way function to the secret value $w_s$, and sending the public value $w_p$ to the server computer;

the server computer, receiving from the client computer the public value $w_p$;

the server computer, generating a secret value $y_s$ and generating a corresponding public value $y_p$ by applying a predefined one-way function to the secret value $y_s$, and sending the public value $y_p$ to the client computer;

the client computer, receiving from the server computer the public value $y_p$;

the server computer, generating a server session key $K_1$ by applying a first predefined session key generation function to the public value $w_p$, the password verification value v, and the secret value $y_s$;

the client computer, receiving a password p from the user; and the client computer, generating a client session key $K_2$ by applying a second predefined session key generation function to the public value $y_p$, the password p, and the secret value $w_s$, wherein the password verification value v is not sent to the client computer, the secret value $w_s$ is not sent to the server computer, the secret value $y_s$ is not sent to the client computer, and the password p is notices to the server computer.

27. A method of establishing a login session between a server computer and a client computer such that the login session is permitted when a server computer session key $K_1$ matches a client computer session key $K_2$, comprising:

the server computer, prior to a login session, storing a respective password verification value v for each of a plurality of authorized users of the server computer;

the client computer, receiving a user identifier identifying a user;

the client computer, sending the user identifier to a server computer the server computer, receiving a user identifier from the client computer, and retrieving the password verification value v corresponding to the received user identifier;

the client computer, generating a secret value $w_s$ and generating a corresponding public value $w_p$ by applying a predefined one-way function to the secret value $w_s$, and sending the public value $w_p$ to the server computer;

the server computer, receiving from the client computer the public value $w_p$;

the server computer, generating a secret value $y_s$ and generating a corresponding public value $y_p$ by applying a predefined one-way function to the secret value $y_s$, and sending the public value $y_p$ to the client computer;

the client computer, receiving from the server computer the public value $y_p$;

the server computer, generating a server session key $K_1$ by applying a first predefined session key generation function to the public value $w_p$, the password verification value v, and the secret value $y_s$;

the client computer, receiving a password p from the user; and the client computer, generating a client session key $K_2$ by applying a second predefined session key generation function to the public value $y_p$, the password p, and the secret value $w_s$, wherein the password verification value v is not sent to the client computer, and no function of v is sent to the client computer.

28. A method of establishing a login session between a server computer and a client computer such that the login session is permitted when a server computer session key $K_1$ matches a client computer session key $K_2$, comprising:

the server computer, prior to a login session, storing a respective password verification value v for each of a plurality of authorized users of the server computer, the client computer, receiving a user identifier identifying a user;

the client computer, sending the user identifier to a server computer the server computer, receiving a user identifier from the client computer, and retrieving the password verification value v corresponding to the received user identifier;

the client computer, generating a secret value $w_s$ and generating a corresponding public value $w_p$ by applying a predefined one-way function to the secret value $w_s$, and sending the public value $w_p$ to the server computer;

the server computer, receiving from the client computer the public value $w_p$;

the server computer, generating a secret value $y_s$ and generating a corresponding public value $y_p$ by applying a predefined one-way function to the secret value $y_s$, and sending the public value $y_p$ to the client computer;

the client computer, receiving from the server computer the public value $y_p$;

the server computer, generating a server session key $K_1$ by applying a first predefined session key generation function to the public value $w_p$, the password verification value v, and the secret value $y_s$;

the client computer, receiving a password p from the user; and the client computer, generating a client session key $K_2$ by applying a second predefined session key generation function to the public value $y_p$, the password p, and the secret value $w_s$, wherein the password p is not sent to the server computer, and no function of the password p is sent to the server computer.

29. A method of establishing a login session between a server computer and a client computer such that the login session is permitted when a server computer session key $K_1$ matches a client computer session key $K_2$, comprising the steps performed by the server computer of:

prior to a login session, storing a respective password verification value v for each of a plurality of authorized users of the server computer;

receiving a user identifier from the client computer, and retrieving the password verification value v;

receiving from the client computer a public value $w_p$;

generating a secret value $y_s$ and generating a corresponding public value $y_p$ by applying a predefined one-way function to the secret value $y_s$, and sending the public value $y_p$ to the client computer; and generating a server session key $K_1$ by applying a predefined session key generation function to the public value $w_p$, the password verification value v, and the secret value $y_s$, wherein the password verification value v is not sent to the client computer, and the secret value $y_s$ is not sent to the client computer.

30. A method of establishing a login session between a server computer and a client computer such that the login session is permitted when a server computer session key $K_1$ matches a client computer session key $K_2$, comprising the steps performed by the server computer of:

prior to a login session, storing a respective password verification value v for each of a plurality of authorized users of the server computer;

receiving a user identifier from the client computer, and retrieving the password verification value v;

receiving from the client computer a public value $w_p$;

generating a secret value $y_s$ and generating a corresponding public value $y_p$ by applying a predefined one-way function to the secret value $y_s$, and sending the public value $y_p$ to the client computer; and generating a server session key $K_1$ by applying a predefined session key generation function to the public value $w_p$, the password verification value v, and the secret value $y_s$, wherein the password verification value v is not sent to the client computer, and no function of the password verification value v is sent to the client computer.

31. A method of establishing a login session between a server computer and a client computer such that the login session is permitted when a server computer session key $K_1$ matches a client computer session key $K_2$, comprising the steps performed by the client computer of:

receiving a user identifier, wherein the user identifier identifies a user;

sending the user identifier to a server computer;

generating a secret value $w_s$ and generating a corresponding public value $w_p$ by applying a predefined one-way function to the secret value $w_s$, and sending the public value $w_p$ to the server computer;

receiving a public value $y_p$ from the server computer; and generating a secret value x corresponding to the password p specified by the user, generating a client session key $K_2$ by applying a predefined session key generation function to the public value $y_p$, the secret value $w_s$, and the secret value x, wherein the secret value x is not sent to the server computer, and the secret value $w_s$ is not sent to the server computer.

32. A method of establishing a login session between a server computer and a client computer such that the login session is permitted when a server computer session key $K_1$ matches a client computer session key $K_2$, comprising the steps performed by the client computer of:

receiving a user identifier, wherein the user identifier identifies a user;

sending the user identifier to a server computer;

generating a secret value $w_s$ and generating a corresponding public value $w_p$ by applying a predefined one-way function to the secret value $w_s$, and sending the public value $w_p$ to the server computer;

receiving a public value $y_p$ from the server computer; and generating a secret value x corresponding to the password p specified by the user, generating a client session key $K_2$ by applying a predefined session key generation function to the public value $y_p$, the secret value $w_s$, and the secret value x, wherein the password verification value x is not sent to the server computer, no function of x is sent to the server computer, the password p is not sent to the server computer, and no function of the password p is sent to the server computer.

33. A computer program product for use in conjunction with a server computer system when establishing a login session between the server computer and a client computer, the computer program product comprising a computer readable storage medium and a computer program mechanism embedded therein, the computer program mechanism comprising:

a server side login procedure, including:

instructions for storing a respective password verification value v for each of a plurality of authorized users of the server computer;

instructions for receiving a user identifier from the client computer, and retrieving the password verification value stored by the server for the user corresponding to the received user identifier;

instructions for receiving from the client computer a public value $w_p$;

instructions for generating a secret value $y_s$ and generating a corresponding public value $y_p$ by applying a predefined one-way function to the secret value $y_s$, and sending the public value $y_p$ to the client computer;

instructions for generating a server session key $K_1$ by applying a predefined session key generation function to the public value $w_p$, the retrieved password verification value v, and the secret value $y_s$;

the server side login procedure including instructions for generating a random number u and sending the random number u to the client computer after receiving from the client computer the public value $w_p$;

the instructions for generating server key $K_1$ including instructions for applying the predefined session key generation function to the public value $w_p$, the retrieved password verification value v, the secret value $y_s$ and the random number u; and instructions for receiving a client session key $K_2$; wherein the login session is established if $K_1$ matches $K_2$.

34. A method of establishing a login session between a server computer and a client computer such that the login session is permitted when a server computer session key $K_1$ matches a client computer session key $K_2$, comprising the steps performed by the server computer of:

prior to a login session, storing a respective password verification value v for each of a plurality of authorized users of the server computer;

receiving a user identifier from the client computer, and retrieving the password verification value v;

receiving from the client computer a public value $w_p$;

generating a secret value $y_s$ and generating a corresponding public value $y_p$ by applying a predefined one-way function to the secret value $y_s$, and sending the public value $y_p$ to the client computer;

generating a server session key $K_1$ by applying a predefined session key generation function to the public value $w_p$, the password verification value v, and the secret value $y_s$;

generating a random number u and sending the random number u to the client computer after receiving from the client computer the public value $w_p$; and the step of generating server key $K_1$ including applying the predefined session key generation function to the public value $w_p$, the password verification value v, the secret value $y_s$ and the random number u, wherein the step of generating a random number u includes applying a predefined generation function to $w_p$.

35. A method of establishing a login session between a server computer and a client computer such that the login session is permitted when a server computer session key $K_1$ matches a client computer session key $K_2$, comprising the steps performed by the server computer of:

prior to a login session, storing a respective password verification value v for each of a plurality of authorized users of the server computer;

receiving a user identifier from the client computer, and retrieving the password verification value v;

receiving from the client computer a public value $w_p$;

generating a secret value $y_s$ and generating a corresponding public value $y_p$ by applying a predefined one-way function to the secret value $y_s$, and sending the public value $y_p$ to the client computer; and generating a server session key $K_1$ by applying a predefined session key generation function to the public value $w_p$, the password verification value v, and the secret value $y_s$, said predefined session key generation function differs from a second predefined session key generation function coupled with said client session key $K_2$.

36. A method of establishing a login session between a server computer and a client computer such that the login session is permitted when a server computer session key $K_1$ matches a client computer session key $K_2$, comprising the steps performed by the client computer of:

receiving a user identifier, wherein the user identifier identifies a user;

sending the user identifier to a server computer;

generating a secret value $w_s$ and generating a corresponding public value $w_p$ by applying a predefined one-way function to the secret value $w_s$, and sending the public value $w_p$ to the server computer;

receiving a public value $y_p$ from the server computer; and generating a secret value x corresponding to the password p specified by the user, generating a client session key $K_2$ by applying a predefined session key generation function to the public value $y_p$, the secret value $w_s$, and the secret value x, said client session key $K_2$ is generated from a single stage communication with said server computer, said predefined session key generation function differs from a second predefined session key generation function coupled with said server session key $K_1$.

37. A computer program product for use in conjunction with a server computer system when establishing a login session between the server computer and a client computer, the computer program product comprising a computer readable storage medium and a computer program mechanism embedded therein, the computer program mechanism comprising:

a server side login procedure, including:

instructions for storing a respective password verification value v for each of a plurality of authorized users of the server computer;

instructions for receiving a user identifier from the client computer, and retrieving the password verification value stored by the server for the user corresponding to the received user identifier, instructions for receiving from the client computer a public value $w_p$;

instructions for generating a secret value $y_s$ and generating a corresponding public value $y_p$ by applying a predefined one-way function to the secret value $y_s$, and sending the public value $y_p$ to the client computer; and instructions for generating a server session key $K_1$ by applying a predefined session key generation function to the public value $w_p$, the retrieved password verification value v, and the secret value $y_s$, said predefined session key generation function differs from a second predefined session key generation function coupled with said client session key $K_2$.

38. A method of establishing a login session between a server computer and a client computer such that the login session is permitted when a server computer session key $K_1$ matches a client computer session key $K_2$, comprising the steps performed by the server computer of:

prior to a login session, storing a respective password verification value v for each of a plurality of authorized users of the server computer;

receiving a user identifier from the client computer, and retrieving the password verification value v;

receiving from the client computer a public value $w_p$;

generating a secret value $y_s$ and generating a corresponding public value $y_p$ by applying a predefined one-way function to the secret value $y_s$, and sending the public value $y_p$ to the client computer; and generating a server session key $K_1$ by applying a predefined session key generation function to the public value $w_p$, the password verification value v, and the secret value $y_s$, said server session key $K_1$ is generated from a single stage communication with said client computer, said predefined session key generation function differs from a second predefined session key generation function coupled with said client session key $K_2$.

* * * * *